May 22, 1923.

J. A. COWAN

VEHICLE TOP AND BOAT

Filed July 15, 1921

INVENTOR
BY John A. Cowan
ATTORNEY

May 22, 1923.

J. A. COWAN

VEHICLE TOP AND BOAT

Filed July 15, 1921

INVENTOR
John A. Cowan
BY
ATTORNEY

Patented May 22, 1923.

1,455,994

UNITED STATES PATENT OFFICE.

JOHN A. COWAN, OF KANSAS CITY, MISSOURI.

VEHICLE TOP AND BOAT.

Application filed July 15, 1921. Serial No. 484,860.

*To all whom it may concern:*

Be it known that I, JOHN A. COWAN, a citizen of the United States, residing at Kansas City, in the county of Jackson and State of Missouri, have invented certain new and useful Improvements in Vehicle Tops and Boats; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a vehicle top adapted to be converted into a boat and the object of the invention is to provide means whereby the top may interchangeably serve as a covering for the vehicle or as a boat or pontoon for carrying it across streams, it being obvious that the boat may also be utilized for conveying the passengers either at the time of ferrying the vehicle or independently thereof.

The invention particularly contemplates the application of a removable top to touring vehicles, such as motor vehicles, and has for one of its objects the provision of means whereby the vehicle may be conveyed across streams which could not ordinarily be forded in the usual way.

The removable top is of such character that it can by being inverted be converted into a boat for the purpose of conveying passengers, affording the additional pleasure of boating when the vehicle is near the bank of a stream.

The application of the top and its removal from the vehicle can be readily accomplished without special skill and with the ordinary tools usually found in the tool box of a motor vehicle.

Figure 1:
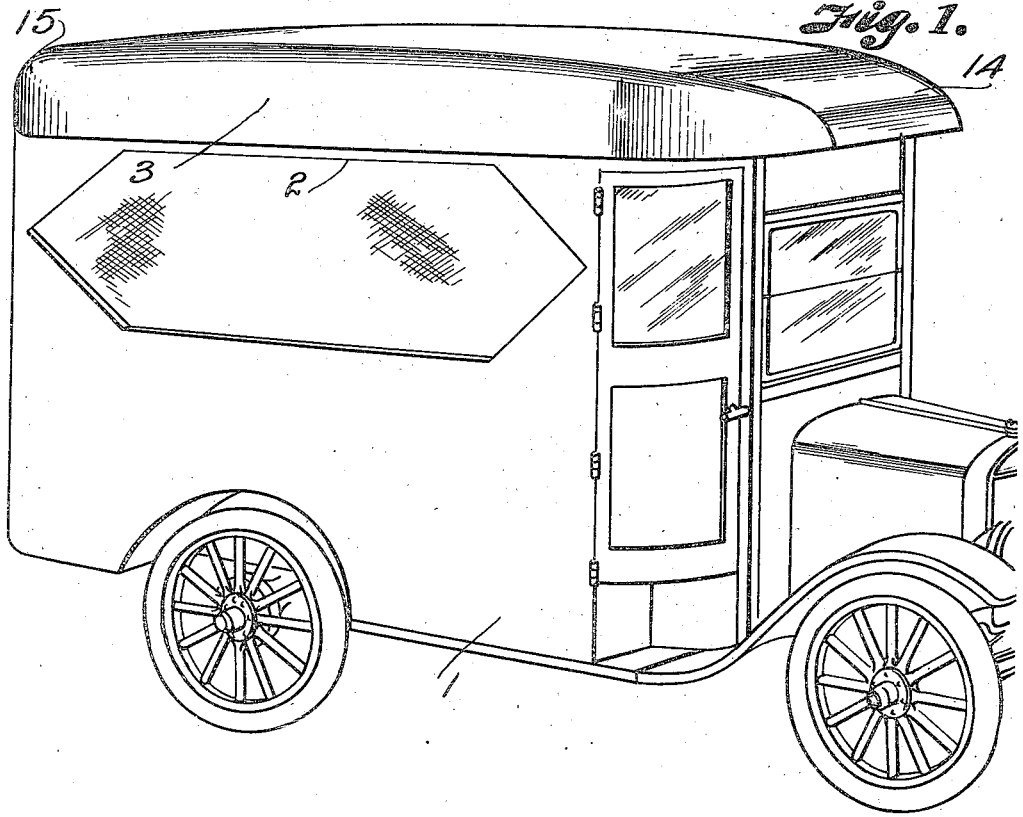
Fig. 1 is a perspective view of a motor vehicle, showing the removable top in normal position.
Figure 2:
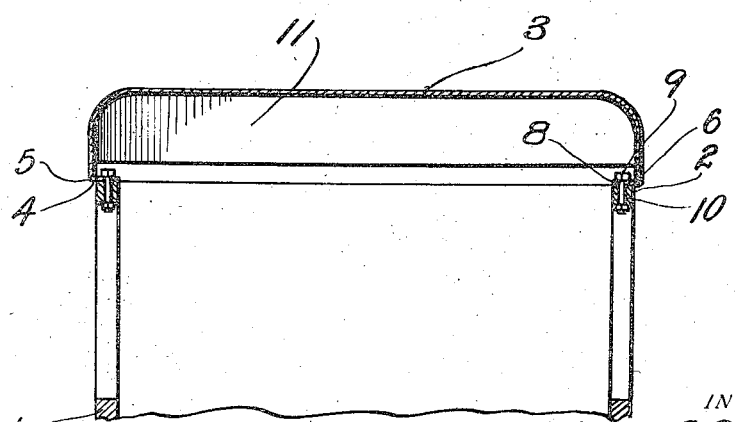
Fig. 2 is a transverse sectional view through the upper portion of the body of the vehicle and through the top.

The vehicle 1 may be of conventional form and provided with an open top surrounded by a rail 2. The rail 2 is adapted to support a removable cover or top 3, which is shown as boat-shaped and which has an inturned flange 4 comprising the side rails 5 and 6 and the rear rail 7, which connects them. These rails are provided with openings 8 to receive fastening devices or bolts 9, which may also pass through openings 10 in the rail 2 whereby the top or cover may be secured to the sides and ends of the vehicle. The boat-shaped top is preferably provided at its respective ends with bulkheads 11 and 12 to increase its buoyancy and reduce the liability of the top sinking when it is used as a boat.

Figure 3:
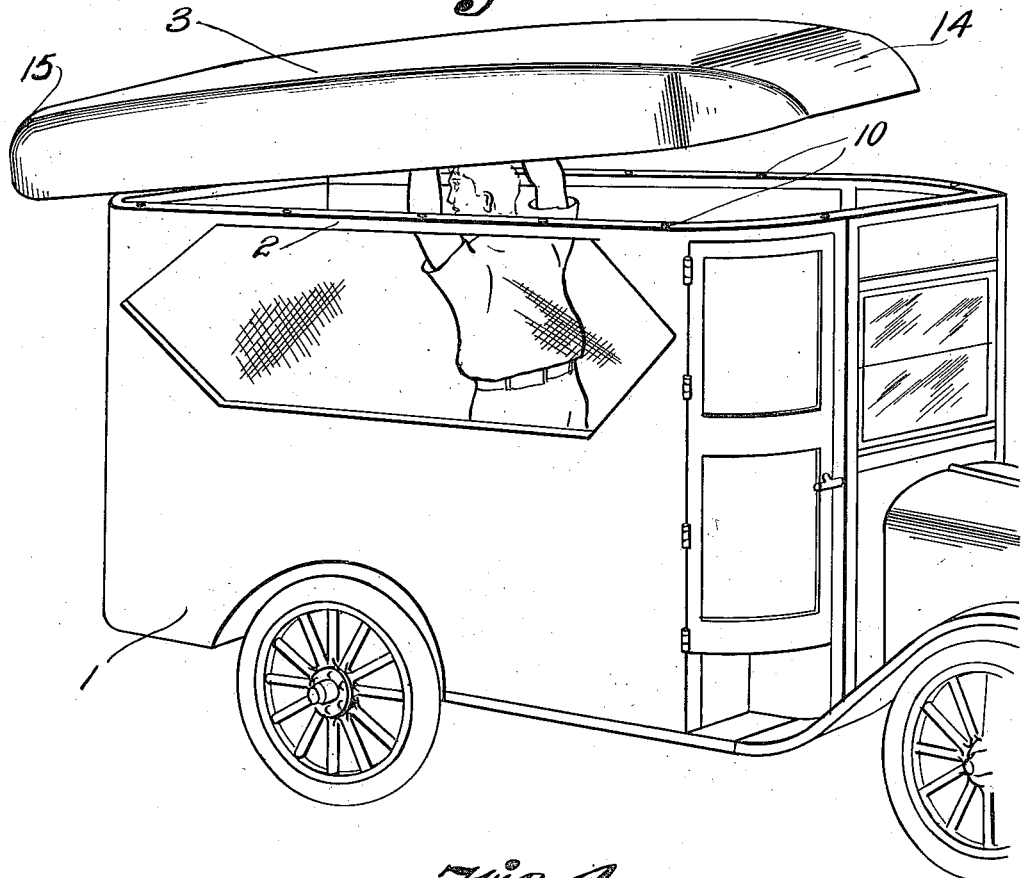
Fig. 3 is a perspective view showing the removable top being removed.
Figure 4:
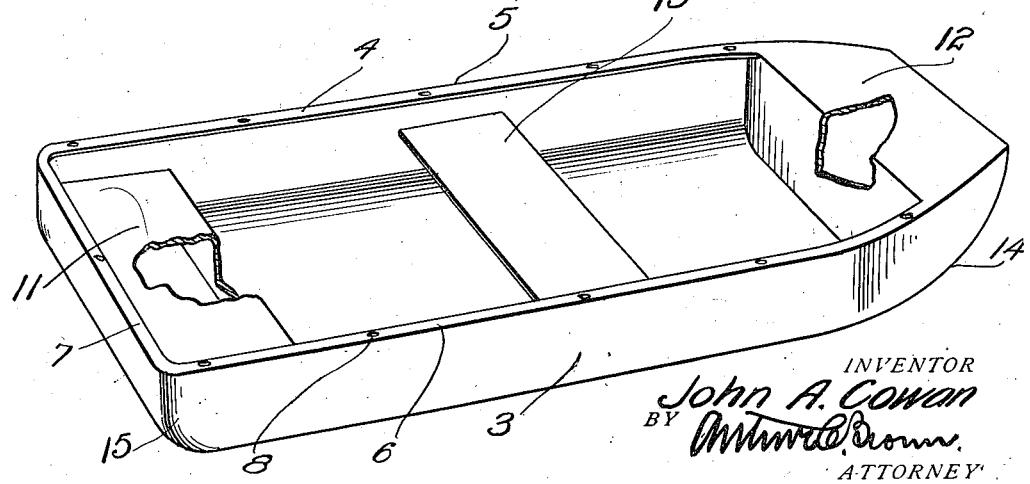
Fig. 4 is a perspective view showing the removable top in position to serve as a boat, barge or pontoon.

The bulkhead 11 as well as the bulkhead 12 may constitute seats for passengers and I may provide an additional seat 13 intermediate the ends of the top as shown in Fig. 4, the seat also serving as a hand hold whereby the operator may grasp the seat to lift the top from the vehicle, as shown in Fig. 3, when it is desired to use it as a boat, pontoon or barge.

The bow of the boat may be curved as at 14 and the stern 15 may be rounded symmetrically to give a finished appearance to the vehicle when the top is in the position shown in Fig. 1 and to further enable the top to serve as a boat when it is in the position shown in Fig. 4.

The generic embodiment of my invention contemplates the application of an invertible top adapted to serve as a boat for supporting the vehicle when occasion arises and which may be readily applied and detached.

What I claim and desire to secure by Letters-Patent is:

1. The combination with a vehicle having an inclosing body comprising side walls, and end walls, and a boat, the shape and size of which conforms to the contour of the upper edge of the body so that the boat can be applied to the top of the body to constitute a roof, the boat being removable therefrom to function as such.

2. The combination with a vehicle having an enclosing body comprising side walls and end walls, and a boat, the shape and size of which conforms to the contour of the upper edge of the body so that the boat can be applied to the top of the body to constitute a roof, the boat being removable therefrom to function as such, and means for removably fastening the boat to the upper edge of the body.

In testimony whereof I affix my signature.

JOHN A. COWAN.